UNITED STATES PATENT OFFICE.

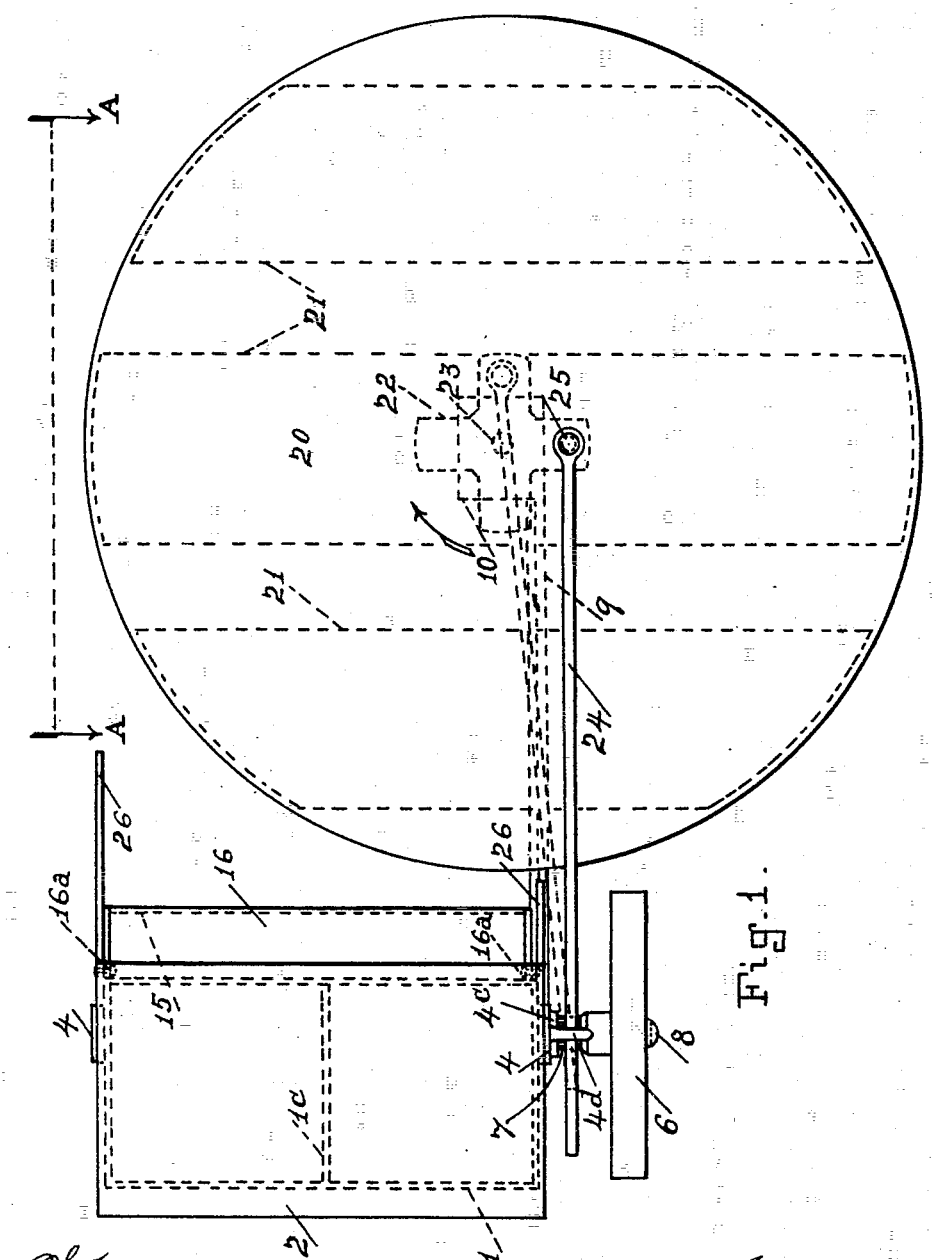

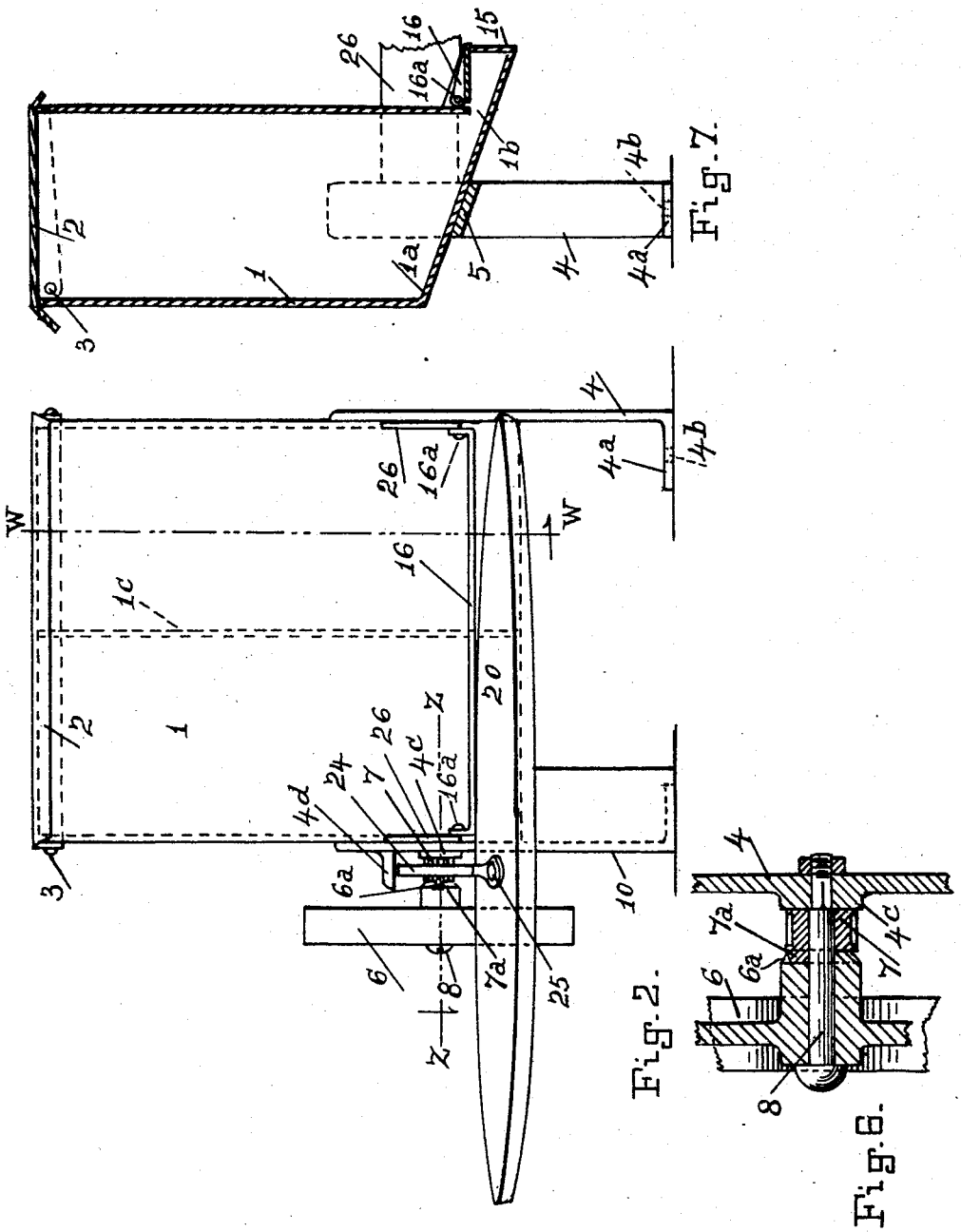

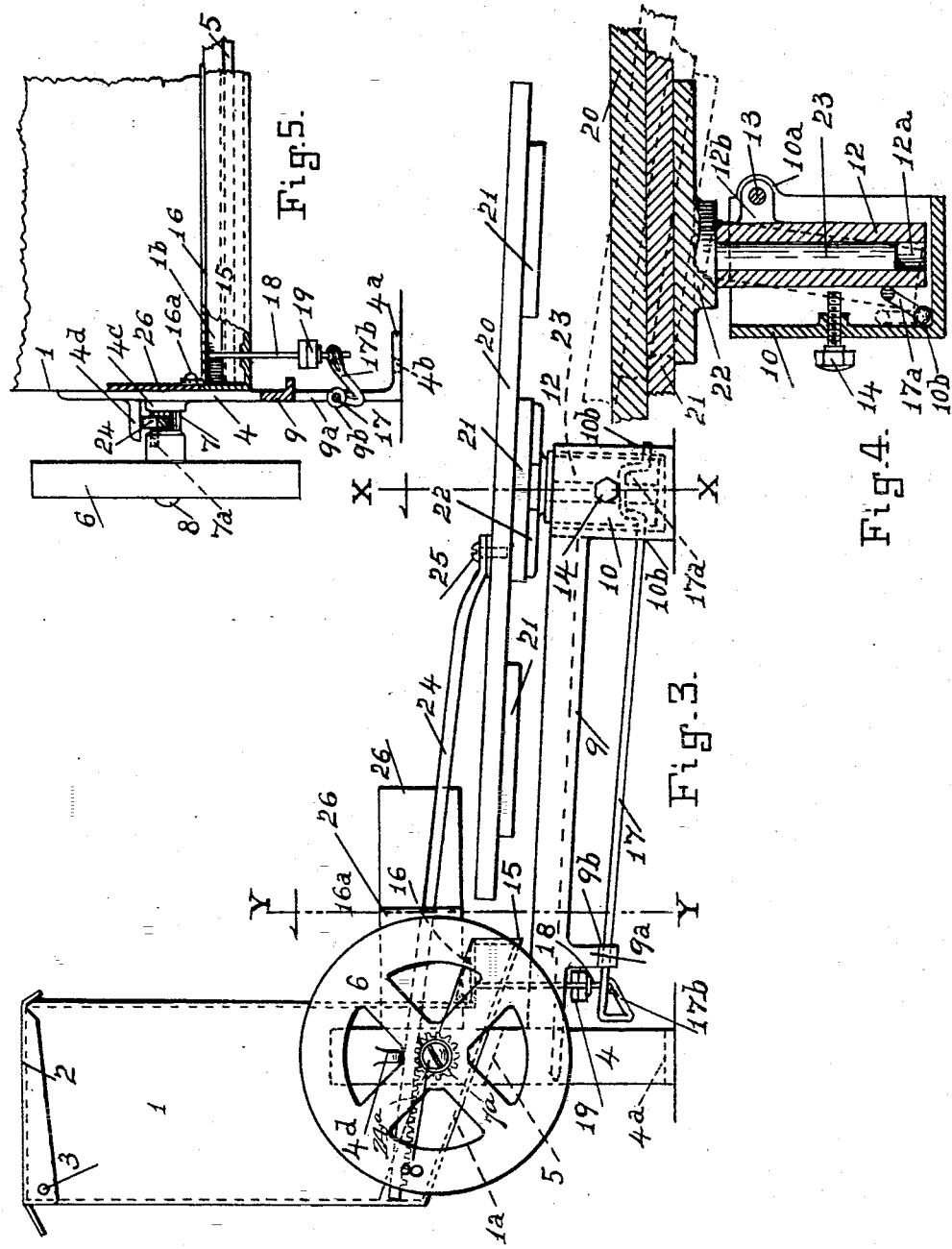

JOHN W. LARIMORE, OF SPRINGFIELD, ILLINOIS.

FEEDER AND EXERCISER.

1,183,016.  Specification of Letters Patent.  Patented May 16, 1916.

Application filed March 4, 1915. Serial No. 12,188.

*To all whom it may concern:*

Be it known that I, JOHN W. LARIMORE, a citizen of the United States, residing at Springfield, in the county of Sangamon and State of Illinois, have invented a new and useful Feeder and Exerciser, of which the following is a specification.

The invention is primarily designed for the feeding and exercising of poultry, the exercising being a necessary concomitant to the feeding.

The general purpose of the invention is to provide a covered feed trough in conjunction with a bin containing a supply of feed, and a tread mill so constructed that the weight of a fowl or other animal, may be utilized to raise the cover of the trough and expose the feed, to induce the fowl or animal to walk toward the feed, said tread mill and connections being so constructed and arranged that if the fowl or animal ceases to walk thereon toward the feed, it will be automatically carried away from the feed, thus making access to the feed contingent on constant walking of the fowl or animal.

More specific purposes of the invention are to provide a rotative platform or tread mill normally occupying a forwardly inclined position and adapted to be tilted to a laterally inclined position upon the application of weight on the platform at a place remote from the axis of the platform; to provide in conjunction with a stationary feed-trough having a movable cover, a rotative and tiltable platform and connecting devices connecting the cover with the platform in such manner that the tilting of the platform will cause the cover to operate to expose the contents of the feed trough; to provide means for varying the scope of the tilting of the platform; to provide means for governing the speed of rotation of the platform; and to provide other new and useful features of construction hereinafter described.

The invention is illustrated in the annexed drawings to which reference is hereby made and will be hereinafter particularly described and finally recited in the claims.

Figures 1, 2, and 3 are respectively a top plan, a front elevation and a side elevation of an apparatus embodying my invention; Fig. 4 is an enlarged partial vertical section on the line X. X. of Fig. 3; Fig. 5 is an enlarged vertical section on the line Y. Y. of Fig. 3; Fig. 6 is an enlarged partial horizontal section on the line Z. Z. of Fig. 2; and Fig. 7 is a partial vertical section on the line W. W. of Fig. 2.

Similar reference characters designate like parts in the different views.

The bin 1 is preferably a rectangular structure of galvanized sheet steel and has a downwardly and forwardly inclined bottom $1^a$, and a longitudinal opening $1^b$ in communication with the feed trough. A vertical partition $1^c$ divides the bin into compartments, to contain different kinds of feed. A cover 2 is connected with the bin 1 by pivotal rivets 3. Legs 4 are rigidly connected with and support the bin and have feet $4^a$ provided with holes $4^b$ to receive bolts or screws for connecting the legs with a floor or other stable object. One of the legs has an integral boss $4^c$ and an integral stud $4^d$. The legs are connected by a cross bar 5 on which the bottom of the bin rests. A fly wheel 6 and a cog wheel 7 are rotative on a shouldered bolt 8 extending through the boss $4^c$. For convenience in manufacture the cog wheel 7 is made separately from the fly wheel 6, and is connected therewith by a small stud $7^a$ on the wheel 7, engaging in a notch $6^a$ in the hub of the wheel 6. An angle bar 9 extends forwardly in line with one of the legs 4 and is preferably integral with the leg and has an integral hanger $9^a$. A box 10 at the forward end of the bar 9 is preferably integral with the bar. The box 10 has three walls and a bottom, and also has ears $10^a$. A block 12 fits loosely within the box 10 and has a longitudinal bore $12^a$ adapted to accommodate the shaft of the rotative platform. A screw 14 mounted in one wall of the box 10 may be screwed inwardly or outwardly to control the scope of the tilting of the block 12. The feed trough 15 is rigid on the bin 1 and in communication with the interior of the bin through the opening $1^b$. A cover 16 is connected with the ends of the trough by rivets $16^a$ so that the cover may turn freely on the rivets. A rod 17 is oscillative in a bearing $9^b$ in the hanger $9^a$, and bearings $10^b$ in the box 10. Near the front end of the rod is a crank $17^a$, which is acted upon by the lower part of the oscillative block 12, in such manner that inward swinging of the block within the box will cause the lower part of the block to push on the crank to effect partial rotation of the shaft and when the block swings back to its initial position the crank will gravitate back to its initial position. The extreme inward swing of the block and the corresponding position of the crank are indicated by dotted lines in Fig. 4.

At the rear end of the rod is an angular member 17ᵇ which is flexibly connected with a vertically slidable rod 18. The inward swinging of the block 12 causes the lower part of the block to act on the crank 17ᵃ to cause partial rotation of the rod 17 so that the member 17ᵇ will push the rod 18 upward and the upper end of the rod acting on the under side of the cover 16 will raise the cover and expose the feed in the trough 15, and when the pressure against the crank 17ᵃ is removed the weight 19 will cause the rod 18 to slide downward and release the cover 16 so it will gravitate to its closed position, and the rod 18 will act on the member 17ᵇ to cause partial reverse rotation of the rod 17 to restore the parts 17ᵃ and 12, to their initial positions in readiness for the next operation.

The platform 20 is preferably a wooden disk reinforced by plates 21 on its under side. A spider 22, of suitable material is rigidly connected with the central part of the central plate 21. The axle 23 is preferably integral with the spider and is adapted to rotate freely in the bore 12ᵃ of the block 12. The rack bar 24 has on its under side teeth 24ᵃ adapted to mesh with the teeth 7ᵃ of the cog wheel 7. A screw 25 pivotally connects the rack bar with the platform 20. The stud 4ᵈ projects over the rack bar and prevents upward displacement of the bar. When the parts are assembled, the platform will normally be at rest in a forwardly inclined position and the cover of the feed trough will be in its closed position. Forwardly extending guards 26 prevent the animals or fowls from feeding at the ends of the feed trough and compel them to approach the trough from the front.

The mode of operation is as follows: Feed having been placed in the bin 1 will pass through the opening 1ᵇ into the trough 15. The platform will be guarded by any suitable means (not shown) so that the animal or fowl will approach the platform within the limits indicated by the arrows A (Fig. 1). The animal or fowl seeking feed will place itself on the platform and the weight of the animal or fowl will cause the platform to tilt laterally as indicated by dotted lines in Fig. 4. The lateral tilting of the forwardly inclined platform causes the platform to take a position such that the lowest point of the platform will be in the circumference of the platform and about thirty degrees distant from a vertical plane in the axis of the platform and at right angles to the bar 9, and as far as possible away from the feed trough 15, in order that the animal or fowl on the platform at that point can not reach the feed in the trough. The tilting platform will operate the rods 17 and 18 to raise the cover 16, as already described, so that the fowl or animal can see the feed in the trough, and seeing the feed, will naturally walk toward it, and the walking of the fowl or animal on the inclined platform will cause rotation of the platform which will carry the fowl or animal away from the trough and cause it to continue to walk toward the trough. The partial rotation of the platform caused by the walking of the fowl or animal will cause sliding of the rack bar 24, which will in turn cause rotation of the fly wheel 6, clockwise or counter-clockwise according to the direction of sliding of the rack bar. When the rack bar reaches the limit of its sliding in either direction, its direction of travel will be reversed, and upon reversal of the direction of sliding of the rack bar it will engage the cog gear 7 to cause reverse rotation of the fly-wheel 6, the result being that the rotation of the platform will be momentarily interrupted and the platform will remain at rest for a short interval during which the fowl or animal may take feed from the trough; but the fowl or animal will then be on a relatively high part of the platform and its weight will cause renewed partial rotation of the platform. The fowl or animal will soon become accustomed to the tread-mill action of the machine and will continue to walk and intermittently take feed from the trough, with the result that the fowl or animal will take liberal exercise in order to obtain a relatively small quantity of feed.

There is considerable difference in the weight of different animals; it is therefore necessary to control the inclination of the platform according to the weight of the animals; if they are relatively heavy slight inclination of the platform will be sufficient, but if they are lighter, greater inclination of the platform will be necessary. The variable inclination of the platform is effected by turning the screw 14 inward or outward, to stop the block 12 in position to give the desired lateral inclination to the platform. The platform capable of variable inclination is a valuable feature of my invention.

It is obvious that minor details of construction may be varied without departure from my invention; the claims therefore are not restricted to the precise construction disclosed, but are to be construed as broadly as may be warranted by the prior art.

What I claim as new and desire to secure by Letters Patent is:

1. In a feeder and exerciser, the combination of a feed trough; a cover complemental to the feed trough; a rotative tread mill adjacent to the feed trough and adapted to be tilted by the weight of an animal on the tread mill; and mechanism for operating the cover, actuated by the tread mill and effective to cause the cover to uncover the feed trough while the tread mill is tilted and effective to cause the cover to close the feed trough while the tread mill is not tilted.

2. In a feeder and exerciser, the combination of a feed trough; a cover effective to cover and uncover the feed trough; a tiltable and rotative tread mill adjacent to the feed trough; and means for operating the cover to uncover the feed trough while the tread mill is tilted.

3. In a feeder and exerciser, the combination of a feed trough; a cover complemental to the feed trough; a rotative and tiltable tread mill; cover-operating mechanism operative by the tilting of the tread mill and effective to keep the cover open while the tread mill is tilted; a fly wheel rotative on a stationary support adjacent to the tread mill and equipped with a cog gear; and a rack bar pivotally connected with the tread mill and engaging the cog gear of the fly wheel to change the direction of the rotation of the fly wheel at each revolution of the tread mill.

4. A tread mill and its governor, comprising a rotative tread mill; a rotative fly wheel provided with a cog gear; and a reciprocating rack bar pivotally connected with the tread mill and co-acting with the cog gear of the fly wheel to change the direction of rotation of the fly wheel at each revolution of the tread mill.

5. In a feeder and exerciser, the combination of a feed trough; a cover complemental to the feed trough; a tiltable tread mill adjacent to the feed trough; a crank rod oscillative by the tilting of the tread mill; and a lifting rod flexibly connected with said crank rod and adapted to operate said cover upon the oscillating of said crank rod.

6. In a feeder and exerciser, the combination of a stationary box; an oscillative block mounted in said box and having a bore adapted to accommodate an axle; a platform having an axle adapted to rotate in the bore of said block; an adjusting device controlling the scope of the oscillation of said block; a rock shaft adapted to be engaged by said oscillative block; a vertically slidable rod connected with said rock shaft; a feed box adjacent to the rotative platform, and a cover complemental to the feed box and adapted to be raised by said vertically slidable rod.

7. In a feeder and exerciser, the combination of a stationary box; an oscillative block in said box adapted to support a rotative platform; a platform rotative on said block; an adjusting device controlling the scope of oscillation of said block; an oscillative shaft having a crank member within said box adapted to be engaged by said oscillative shaft to cause oscillation of said shaft; a feed box adjacent to said rotative platform, a cover complemental to said feed box; a rod connected with said oscillative shaft and adapted to operate said cover; a fly wheel in operative relation to the rotative platform and provided with a gear; and a rack bar pivotally connected with the rotative platform and adapted to engage the gear of the fly wheel to rotate the fly wheel.

In witness whereof, I have hereunto signed my name at Springfield, Illinois, this 27th day of January, 1915.

JOHN W. LARIMORE.

Witnesses:
W. S. TROXELL,
TRAY G. PRINELL.

Copies of this patent may be obtained for five cents each, by addressing the "Commissioner of Patents, Washington, D. C."